(12) United States Patent
Leonhardt

(10) Patent No.: US 8,251,526 B2
(45) Date of Patent: Aug. 28, 2012

(54) SPREAD REFLECTOR FOR A LAMP STRUCTURE

(75) Inventor: Darrin Leonhardt, Gaithersburg, MD (US)

(73) Assignee: Fusion UV Systems, Inc, Gaithersburg, MD (US)

( * ) Notice: Subject to any disclaimer, the term of this patent is extended or adjusted under 35 U.S.C. 154(b) by 223 days.

(21) Appl. No.: 12/496,172

(22) Filed: Jul. 1, 2009

(65) Prior Publication Data

US 2011/0002058 A1    Jan. 6, 2011

(51) Int. Cl.
G02B 7/182 (2006.01)
G02B 5/10 (2006.01)

(52) U.S. Cl. .......................... 359/851; 359/868
(58) Field of Classification Search .................. 359/869
See application file for complete search history.

(56) References Cited

U.S. PATENT DOCUMENTS

| | | | |
|---|---|---|---|
| 5,122,906 A | 6/1992 | Wheatley | |
| 6,280,055 B1 | 8/2001 | Merko | |
| 7,025,476 B2 * | 4/2006 | Leadford | 362/309 |
| 2003/0007147 A1 | 1/2003 | Johnson | |
| 2004/0032034 A1 | 2/2004 | Bhat | |
| 2005/0115498 A1 | 6/2005 | Ingram et al. | |
| 2007/0147049 A1 | 6/2007 | Collins | |
| 2008/0204888 A1 | 8/2008 | Kan et al. | |
| 2009/0027892 A1 * | 1/2009 | Bremerich et al. | 362/297 |
| 2009/0244903 A1 | 10/2009 | Wong et al. | |

OTHER PUBLICATIONS

"Random," Merriam-webster Dictionary, http://www.merriam-webster.com/dictionary/random, Feb. 2, 2012.*

* cited by examiner

Primary Examiner — Jade R Chwasz
(74) Attorney, Agent, or Firm — Lowenstein Sandler PC

(57) ABSTRACT

A spread primary reflector for a UV curing lamp employs a substrate that has been faceted. The facets may be produced by means of stamping, etching, or a combination of chemical-mechanical processes. The faceting randomizes the focusing effects of the primary reflector's elliptical curvature while maintaining a total directed energy output and hence a uniform irradiance of a work product. The reflector may be made of a stand-alone reflective material with a preformed faceting pattern, such as from a metal substrate and coated with an optical coating to tailor the reflective properties of the surface of the substrate.

21 Claims, 5 Drawing Sheets

SPREAD REFLECTOR FOR A LAMP STRUCTURE

FIELD OF THE INVENTION

The invention relates generally to reflectors, and more particularly, to a reflector structure for use in industrial lamps for irradiating surfaces of at least one workpiece.

BACKGROUND OF THE INVENTION

Radiant energy is used in a variety of manufacturing processes to treat surfaces, films, and coatings applied to a wide range of materials. Specific processes include but are not limited to curing (i.e. fixing, polymerization), oxidation, purification, and disinfection. Processes using radiant energy to polymerize or effect a desired chemical change is rapid and often less expensive in comparison to a thermal treatment. The radiation can also be localized to control surface processes and allow preferential curing only where the radiation is applied. Curing can also be localized within the coating or thin film to interfacial regions or in the bulk of the coating or thin film. Control of the curing process is achieved through selection of the radiation source type, physical properties (for example, spectral characteristics), spatial and temporal variation of the radiation, and curing chemistry (for example, coating composition).

A variety of radiation sources are used for curing, fixing, polymerization, oxidation, purification, or disinfections due to a variety of applications. Examples of such sources include but are not limited to photon, electron or ion beam sources. Typical photon sources include but are not limited to arc lamps, incandescent lamps, electrodeless lamps and a variety of electronic (i.e., lasers) and solid-state sources.

An apparatus for irradiating a surface with ultraviolet light includes a lamp (e.g., a modular lamp, such as a microwave-powered lamp having a microwave-powered bulb (e.g., tubular bulb) with no electrodes or glass-to-metal seals), the lamp having reflectors to direct light (photons) on to the surface. The reflectors may desirably utilize a primary elliptical-shaped reflector. A typical reflector structure of a primary reflector is illustrated in FIG. 1.

In FIG. 1, a primary reflector 2 has a generally smooth elliptical shape. A bulb 4, typically electrodeless and containing a gas, is placed at the internal focus of the half-ellipse formed by the primary reflector 2. The bulb 4 and the reflector 2 extend linearly along an axis in a direction moving out of the page (not shown). The gas in the bulb 4 is excited to a plasma state by a source of radio frequency (RF) radiation, such as a magnetron (not shown). The atoms of the excited gas in the bulb 4 return to a lower energy state, thereby emitting ultraviolet light. The ultraviolet light rays 6 radiate from the bulb 4 in all directions, striking the inner surface 8 of the reflector 2 at various points along the reflector 2. The inner surface 8 of the reflector 2 is typically highly reflective, the reflector 2 being formed of or coated with a highly reflective material. The incoming rays 6 are reflected 10 toward the external second focus 12 of the half-ellipse reflector 2. A work product 14 to be cured is typically placed at the second focus 12. The bulb and reflector design are optimized to produce the maximum peak light intensity (lamp irradiance) at the surface of the work product (also propagating linearly out of the page). In circumstances where focusing the light to a fine point (line) is desirable, a very smooth surface with a high specular reflectance provides an ideal reflector design.

However, there are curing applications where high peak irradiance is not desirable, but a distributed total high energy over the surface of the work product is preferred. A reflector 2 of the design of FIG. 1 cannot provide such a solution. Light diffusers are known, such as described in U.S. Pat. No. 6,280, 055 (the '055 patent). The '055 patent describes a light modifier, which is configured to function as an add-on reflector to uniformly illuminate a subject in photographic applications. Unfortunately, the reflector of the '055 patent does not spread a typically focused light pattern with high total energy.

Accordingly, what would be desirable, but has not yet been provided, is a reflector that produces a high total energy over a larger area of the surface of a work product while maintaining a high specular reflectance over the entire inner surface of the reflector.

SUMMARY OF THE INVENTION

The above-described problems are addressed and a technical solution achieved in the art by providing a spread reflector to replace a standard smooth elliptical reflector in a UV curing lamp. Instead of being fabricated from a consistently flat material, the spread reflector employs a material that has been faceted at a scale small compared to the reflector size. The facets may be produced by means of stamping, etching, or a combination of chemical-mechanical processes. The faceting randomizes the focusing effects of the primary reflector's elliptical curvature while maintaining a total directed energy output and hence a consistent irradiance of a work product. The reflector may be made of a stand-alone reflective material with a preformed faceting pattern. In other embodiments, the reflector may be made from a smooth substrate and coated with an optical coating to tailor the spreading properties of the surface.

According to an embodiment of the present invention, a reflector for reflecting radiation produced by a source of radiation for curing applications comprises a substrate having at least one substantially half-elliptical cross-section, the substrate comprising an inner surface, the inner surface being substantially reflective and populated with a plurality of facets, the reflector being sized and shaped to reflect light from the source of radiation placed proximal to an internal focus of the half elliptical cross-section over a volume proximal to an external focus of the half elliptical cross-section. The substrate is further sized and shaped such that a work product placed proximal to the second focus receives a total energy that is substantially the same as that produced by a reflector having substantially the same half-elliptical cross-section with a smooth inner surface.

According to an embodiment of the present invention, at least a portion of the facets form at least one of a randomly-oriented pattern and a regular pattern.

According to an embodiment of the present invention, the reflector may further comprise a reflective material coating on the inner surface, the facets being formed in the coating. The substrate further comprises a back surface, wherein the back surface may be smooth. The reflective material coating may comprise at least one layer of a dielectric material that forms constructive interference filters or a polytetraflouroethylene (PTFE) material. The PTFE material may be one of Gore DRP, Spectralon, and Teflon.

According to an embodiment of the present invention, the facets may be formed in the entire substrate. In some embodiments, the substrate may be made of metal, such as aluminum or stainless steel. More particularly, the substrate may be made from an aluminum Stucco G material. In other embodiments, the substrate is made of a dielectric material, such as quartz or infrared absorbing glasses.

According to an embodiment of the present invention, the facets may be produced by at least one of a stamping, an embossing, an etching, a deposition, a photographic, and a lithographic process. The facets may have a size and pattern that are varied along at least one of a length of the half-elliptical cross-section and along a cross-section corresponding to a length of the source of radiation. The facet size may increase with increasing distance from a center portion of the half-elliptical cross-section.

According to an embodiment of the present invention, a method for manufacturing a reflector for reflecting radiation produced by a source of radiation for curing applications comprises the steps of: providing a substrate; forming the substrate to have at least one substantially half-elliptical cross-section, the substrate comprising an inner surface, the inner surface being substantially reflective; and populating at least the inner surface of the substrate with a plurality of facets, wherein the reflector is sized and shaped to reflect light from the source of radiation placed proximal to an internal focus of the half-elliptical cross-section over a volume proximal to an external focus of the half-elliptical cross-section. The method may further comprise the step of sizing and shaping the substrate such that a work product placed proximal to the second focus receives a total energy that is substantially the same as that produced by a reflector having substantially the same half-elliptical cross-section with a smooth inner surface. The method may further comprise the steps of: coating the inner surface with a reflective material and forming the facets in the coated inner surface.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
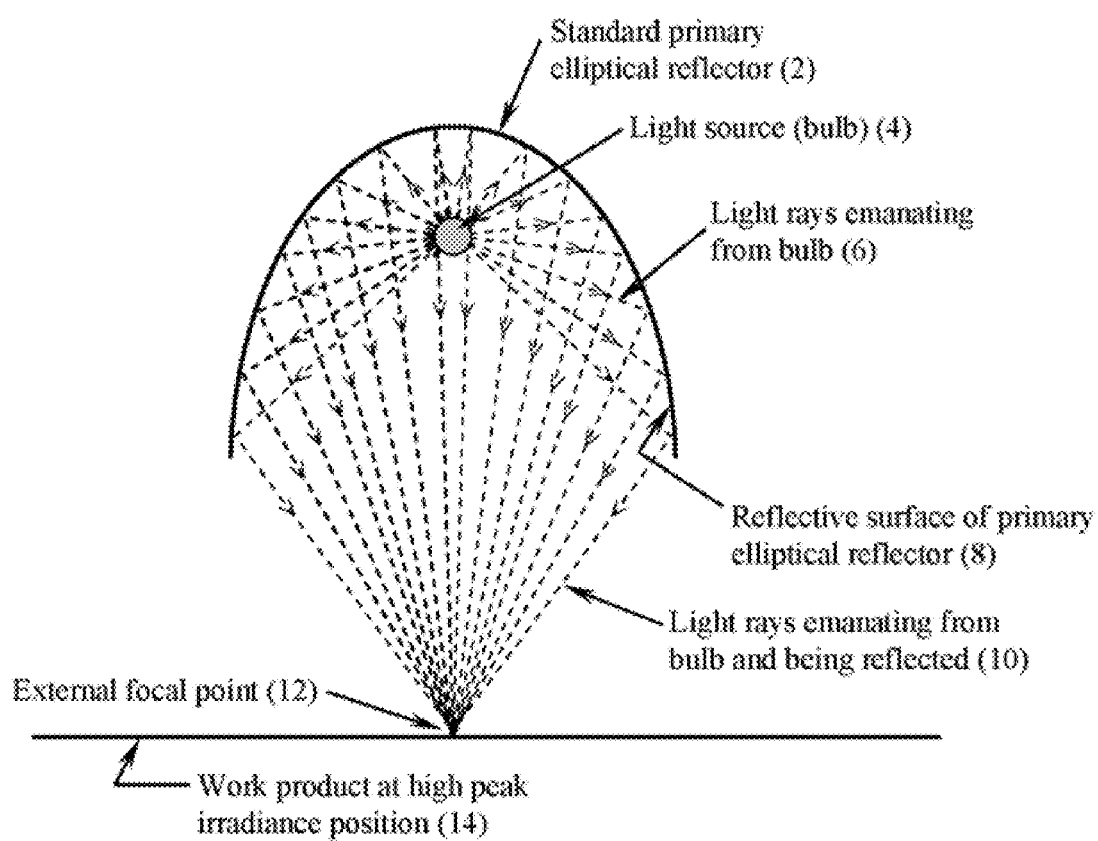
FIG. 1 is a profile of a prior art structure of a primary reflector for ultraviolet (UV) curing applications.
Figure 2:
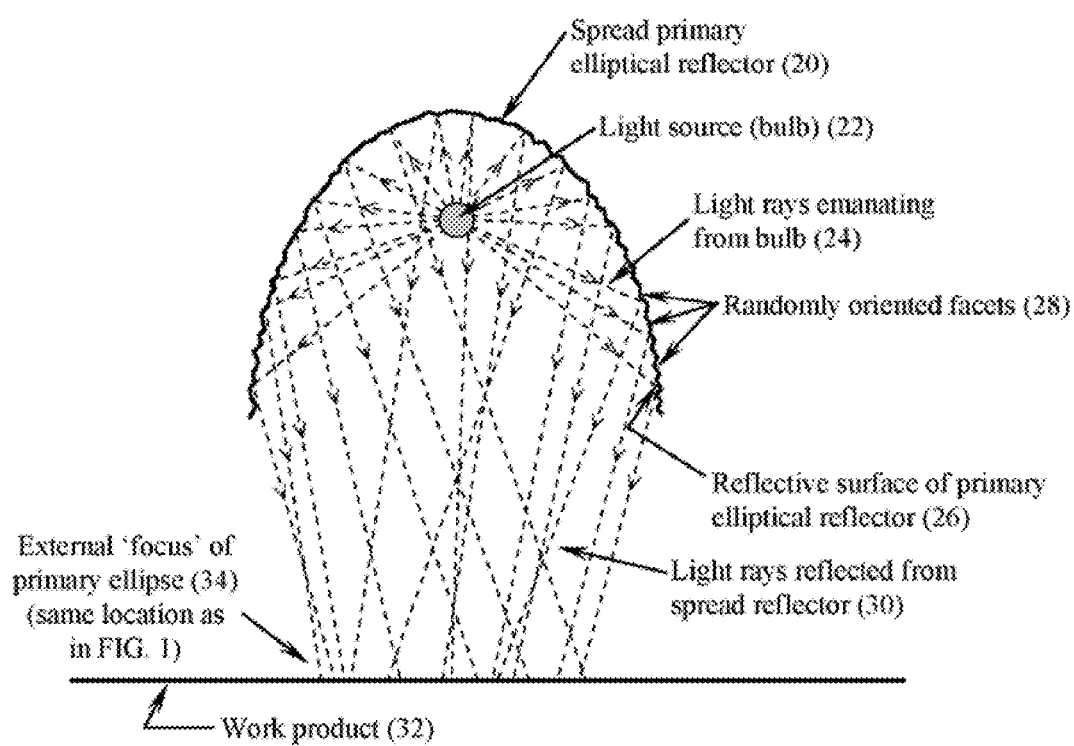
FIG. 2 is a profile of a spread reflector for use in UV curing applications, according to an embodiment of the present invention.

FIG. 2 is a profile of a spread reflector for use in UV curing applications, according to an embodiment of the present invention. In FIG. 2, a spread reflector 20 has an overall elliptical shape. A bulb 22 is placed at the internal focus of the half-ellipse formed by the spread reflector 20. The bulb 22 and the spread reflector 20 may extend linearly along an axis in a direction moving out of the page (not shown). Light rays 24 radiate from the bulb 22 in all directions, striking the inner surface 26 of the spread reflector 20 at various points along the reflector 20. The inner surface 26 of the spread reflector 20 deviates from a smooth ellipse by the presence of a plurality of facets 28. According to an embodiment of the present invention, at least some of the facets 28 may be randomly oriented. According to other embodiments, at least some of the facets 28 may form a regular pattern or form both random and regular patterns.

The light rays 24 are reflected 30 toward and spread over a larger area of a work product 32 placed in the vicinity of the external focus of the primary ellipse 34. The individual facets 28 possess high specular reflectivity, the spread reflector 20 being formed of or coated with a highly reflective material; therefore, the total light output reflected from the inner surface 26 of the spread reflector 20 which strikes the work product 32 remains the same as for a "smooth" reflector that focuses light onto a line/point.

Figure 3:
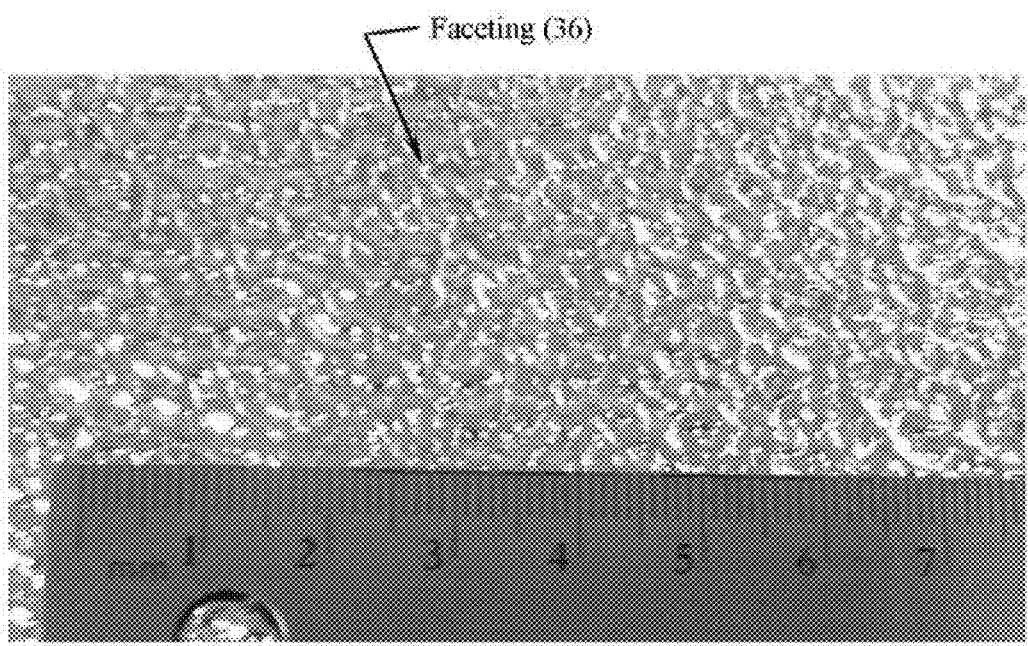
FIG. 3 is a photograph showing a close-up of a material that has been faceted to form a spread reflector, according to an embodiment of the present invention.

FIG. 3 is a photograph showing a close-up of a reflector substrate that has been faceted to form a spread reflector, the facets being shown to scale. According to an embodiment of the present invention, the individual facets may be about 0.5 mm to 2 mm in size (and were used to produce the reflector shown in FIG. 4B and the data provided in FIG. 5 to be described hereinbelow). The facets 36 are produced by physical (stamping, embossing, etc.) or chemical (etching, deposition, photographic, or lithographic) processes. According to an embodiment of the present invention, faceting may be produced on the surface of a reflector substrate facing a bulb. Only the surface of the reflector substrate facing the bulb need be altered, leaving the back surface of the reflector substrate smooth. In other embodiments, the reflector substrate is embossed/stamped, so that the entire substrate is deformed, not only the surface facing the bulb.

As individual facet size increases, the degree to which the reflector spreads output light over the work product to be cured decreases until the original (standard reflector) light pattern is reproduced. Depending on the fabrication technique, the facet size pattern may be varied to provide a larger or smaller focusing area, thereby providing spread reflectors with varying light spreading capabilities. According to an embodiment of the present invention, the facet size and pattern may be varied around the ellipse of the same reflector as well as along the length of the bulb on the same reflector. When varied around the ellipse, smaller facets may be used at the points closest to the bulb (i.e., the ellipse major axis) while larger facets may be used on portions of the reflector furthest from the bulb where the focusing effect is less sensitive. Along the length of the bulb, the facet sizes may be varied to change the light pattern (i.e., from sharp focus to spread focus) across the work product as the work product passes under the lamp.

Figures 4A, 4B:
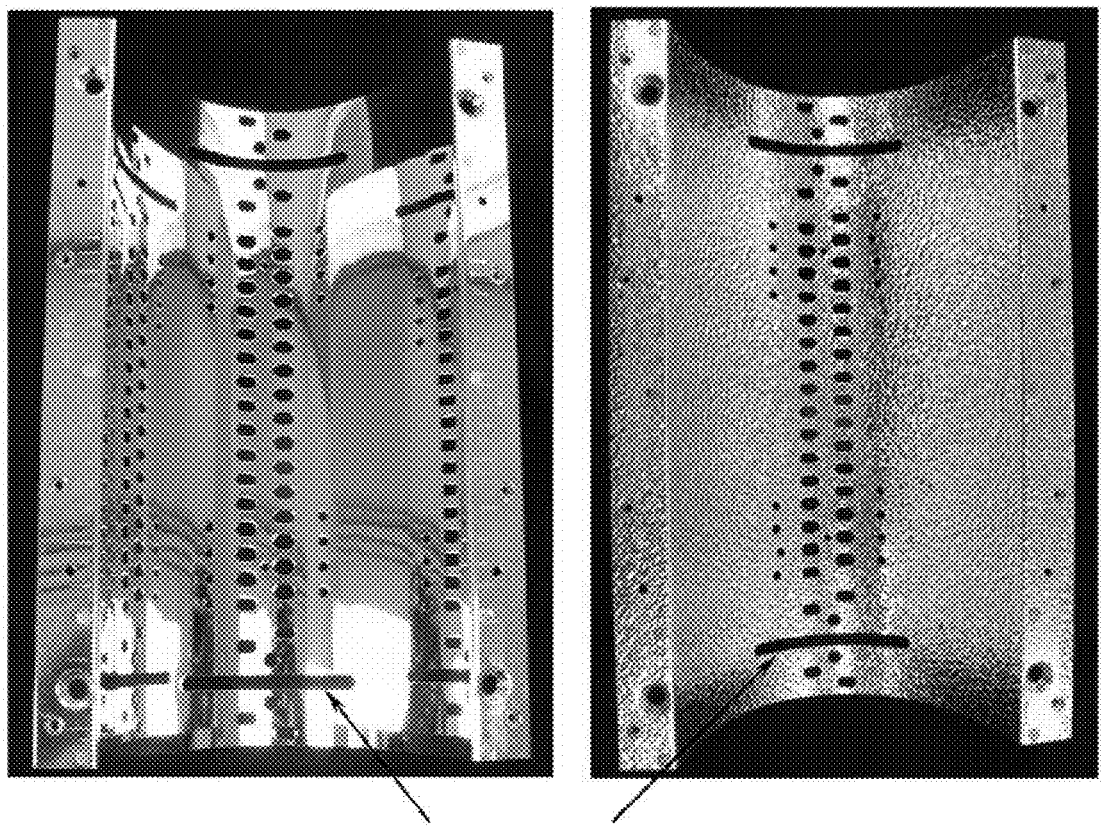
FIGS. 4A and 4B are photographs showing a top-down view of a standard reflector and a prototype spread reflector, respectively.

FIGS. 4A and 4B are photographs showing a standard reflector and a prototype spread reflector, respectively. Typically, reflectors are cut from large sheets in which a hole pattern 40 is punched (or laser cut) prior to adding any additional optical coatings. The reflector may be made of a stand-alone reflective material with a faceting pattern stamped in the entire reflector, such as aluminum "Stucco G" material from Alanod. In other embodiments, the reflector may be made from a smooth substrate made of a metal, such as, but not limited to, aluminum, or stainless steel, or dielectrics, such as, but not limited to, quartz and infrared absorbing glasses. The inner surface that is to face a bulb may be photographically or lithographically etched. In still other embodiments, the inner surface that is to face a bulb is coated with an optical coating to tailor the reflective properties of the inner surface of the reflector. Exemplary optical coatings include multilayers of dielectric materials (for example, silicon and hafnium oxides) that form constructive interference filters or a teflon type material under the generic chemical name polytetraflouroethylene (PTFE) (Gore™ DRP, Spectralon (by LabSphere), and Teflon (by Dupont)). The reflector is then formed to an elliptical shape and mounting brackets (rails) are riveted along the sides of the reflector (not shown).

Figure 5:
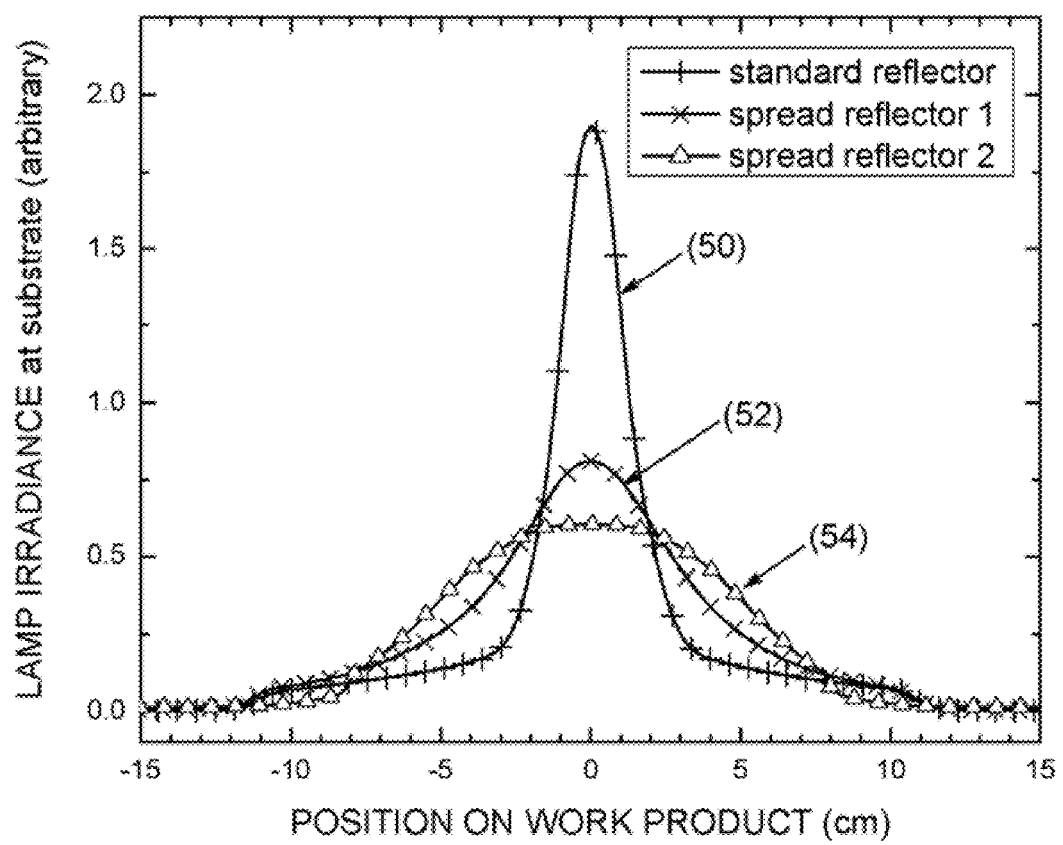
FIG. 5 is a plot of laboratory data showing lamp output (irradiance) at the position of the second focus where a work product to be cured is placed versus distance from the center of the work product for reflectors of various construction and materials.

FIG. 5 is a plot of laboratory data showing lamp output (irradiance) at the position of the external focus where a work product to be cured is placed versus distance from the center of the work product for reflectors of various construction and materials. A standard lamp irradiance profile 50 shows a large peak as used in standard UV curing applications. Other profiles 52, 54 show the effects of spread reflector designs used to redistribute lamp output radiation, while maintaining total lamp output energy. The profile 52 is provided by a reflector made from a standard architectural grade reflector material having a faceted surface (Stucco G by Alanod). The profile 54 is provided by a PTFE-based material (Gore™ DRP). The Gore DRP material supplied with pressure sensitive adhesive was adhered to the inner surface of a standard reflector.

All three designs are highly reflective, with varying degrees of light distribution. The standard lamp reflector producing the profile 50 focuses the light to a small area on the work product. The spread reflectors producing the profiles 52 contain randomly-oriented mirrored facets 52 or light-diffusing material 54 to defocus or spread the light out over a larger area (as shown in the figure), which may be controlled by the individual facet sizes. PTFE-based materials (considered light diffusers), reflect light at arbitrary angles with minimal loss and thereby dispersing the bulb output radiation rapidly from the reflector inner surface.

The present invention has several advantages over the prior art "smooth" reflectors. A spread reflector may be a drop-in replacement for a standard "smooth" reflector. A spread reflector does not impact the microwave cavity performance or bulb cooling. Furthermore, the spread reflector may modify the lamp's output irradiance pattern without adding expensive optical components inside a microwave cavity. In practice, the spread reflector may be used at much closer substrate distances, thereby reducing possible stray light exposure and losses, than a standard reflector for 'far-field' applications. The spread-beam reflector material (e.g., Stucco G) is of comparable cost to the standard smooth (410 Extra Bright by Alanod) reflector material.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A reflector for reflecting radiation produced by a source of radiation for curing applications, comprising a substrate having a half-elliptical cross-section, the substrate comprising an inner surface, the inner surface being substantially reflective and populated with a plurality of facets, the facets having a randomly-oriented pattern with respect to size, shape, location and orientation and configured to randomize and diffuse focusing effects of an elliptical curvature of the reflector, the reflector being sized and shaped to reflect light from the source of radiation placed proximal to an internal focus of the half elliptical cross-section over a volume proximal to an external focus of the half elliptical cross-section.

2. The reflector of claim 1, wherein the substrate is further sized and shaped such that a work product placed proximal to the external focus receives a total energy that is substantially the same as that produced by a reflector having substantially the same half-elliptical cross-section with a smooth inner surface.

3. The reflector of claim 1, further comprising a reflective material coating on the inner surface, the facets being formed in the coating.

4. The reflector of claim 3, wherein the substrate further comprises a back surface, wherein the back surface is smooth.

5. The reflector of claim 1, wherein the reflective material coating is at least one layer of a dielectric material that forms constructive interference filters.

6. The reflector of claim 1, wherein the reflective material coating comprises a polytetraflouroethylene (PTFE) material.

7. The reflector of claim 1, wherein the facets are formed in the entire substrate.

8. The reflector of claim 1, wherein the substrate is made of metal.

9. The reflector of claim 8, wherein the metal is one of aluminum and stainless steel.

10. The reflector of claim 1, wherein the substrate is made of a dielectric material.

11. The reflector of claim 10, wherein the dielectric material is one of quartz and infrared absorbing glasses.

12. The reflector of claim 1, wherein the facets are produced by at least one of a stamping, an embossing, an etching, a deposition, a photographic, and a lithographic process.

13. The reflector of claim 1, wherein the facets have a size and pattern that are varied along at least one of a length of the half-elliptical cross-section and along a cross-section corresponding to a length of the source of radiation.

14. The reflector of claim 12, wherein facet size increases with increasing distance from a center portion of the half-elliptical cross-section.

15. A method for manufacturing a reflector for reflecting radiation produced by a source of radiation for curing applications, comprising the steps of:
providing a substrate;
forming the substrate to have a half-elliptical cross-section, the substrate comprising an inner surface, the inner surface being substantially reflective; and
populating at least the inner surface of the substrate with a plurality of facets, wherein the facets have a randomly-oriented pattern with respect to size, shape, location and orientation and configured to randomize and diffuse focusing effects of an elliptical curvature of the reflector and
wherein the reflector is sized and shaped to reflect light from the source of radiation placed proximal to an internal focus of the half elliptical cross-section over a volume proximal to an external focus of the half elliptical cross-section.

16. The method of claim 15, further comprising the step of sizing and shaping the substrate such that a work product placed proximal to the second focus receives a total energy that is substantially the same as that produced by a reflector having substantially the same half-elliptical cross-section with a smooth inner surface.

17. The method of claim 15, further comprising the steps of:
coating the inner surface with a reflective material and forming the facets in the coated inner surface.

18. The method of claim 15, wherein the step of populating at least the inner surface of the substrate comprises forming the facets in the entire substrate.

19. The method of claim 15, wherein the facets are produced by at least one of a stamping, an embossing, an etching, a deposition, a photographic, and a lithographic process.

20. The method of claim 15, further comprising the step of varying a size and pattern of the facets along at least one of a length of the half-elliptical cross-section and along a cross-section corresponding to a length of the source of radiation.

21. The method of claim 20, wherein facet size increases with increasing distance from a center portion of the half-elliptical cross-section.

* * * * *